United States Patent

Lovelock

[15] 3,638,396
[45] Feb. 1, 1972

[54] GAS CHROMATOGRAPH INTERFACING SYSTEM AND METHOD

[72] Inventor: James E. Lovelock, Bowerchalke, Wilts, England

[73] Assignee: California Institute of Technology, Pasadena, Calif.

[22] Filed: Aug. 25, 1969

[21] Appl. No.: 852,690

[30] Foreign Application Priority Data

Sept. 11, 1968 Great Britain......................43,260/68

[52] U.S. Cl......................................55/16, 55/158, 55/197
[51] Int. Cl............................................................B01d 15/08
[58] Field of Search....................55/16, 158, 67, 197, 386; 73/23.1

[56] References Cited

UNITED STATES PATENTS

| | | | |
|---|---|---|---|
| 3,238,700 | 3/1966 | Cohn | 55/16 |
| 3,319,458 | 5/1967 | Curren | 55/197 X |
| 3,400,514 | 9/1968 | Noda | 55/386 X |
| 3,421,292 | 1/1969 | Llewellyn | 55/197 X |
| 3,430,417 | 3/1969 | Cree | 55/67 X |

*Primary Examiner*—J. L. DeCesare
*Attorney*—Samuel Lindenberg and Arthur Freilich

[57] ABSTRACT

A gas-analyzing system including in sequence a chromatographic gas separator, a second carrier gas inlet, a carrier gas transfer device and a gas component detector such as a gas density balance, thermal conductivity, ionization cross section detector or a mass spectrometer. A minor amount of sample dispersed in a major amount of a first carrier gas is flowed through the chromatographic separator and the effluent from the separator mixes with the second carrier gas before entering the transfer device. The transfer device is selectively permeable to the first carrier gas and in the case of hydrogen may be a heated palladium tube. The hydrogen selectively and totally transfers through the tube and a stream enriched in a sample dispersed in the second carrier gas remains with no loss of sample.

16 Claims, 2 Drawing Figures

INVENTOR.
JAMES E. LOVELOCK

BY *Lindenberg & Freilich*

ATTORNEYS.

GAS CHROMATOGRAPH INTERFACING SYSTEM AND METHOD

ORIGIN OF THE INVENTION

The invention described herein was made in the performance of work under a NASA contract and is subject to the provisions of section 305 of the National Aeronautics and Space Act of 1958, Public Law 85-568 (72 Stat. 435; 42 U.S.C. 2,457).

BACKGROUND OF THE INVENTION

1. Field of the Invention

The present invention relates to apparatus and methods for analyzing gas samples and more particularly to a sensitive and accurate system for analysis of separated constituents of microsized samples.

2. Description of the Prior Art

Analysis of complex samples of matter is greatly facilitated by gasifying the sample and then passing it in gasified form through a separation device such as gas chromatograph which separates the components of the sample into sequential analytical component streams. In a gas chromatograph and other separation apparatus, gas or vapor sample to be analyzed is transported through the various functional parts of the apparatus by a stream of inert carrier gas. While this procedure facilitates automation of analysis, it does however, introduce other problems. Thus, the sample is diluted by the carrier gas and consequently small volume samples may be difficult to detect when so diluted. Also, many of the detectors used to provide an electrical signal from the gas or vapor are accurate only if the carrier gas flow rate is held substantially constant.

Reliable detectors such as thermal conductivity, ionization cross section or gas density balance detectors are concentration-sensing devices. With such detectors changes in carrier gas flow rate directly alter the sample concentration and consequently affect the accuracy of measurement. These detectors produce a signal related to the concentration of sample gas or vapor in the carrier gas. Consequently any variation in the rate of flow of carrier gas after the injection of sample will be followed by a corresponding change in sample concentration. The detector will faithfully follow these changes in the sample concentration and the time integral of its signal will not be an arcuate measure of the quantity injected. The conditions for accurate analysis utilizing these otherwise excellent detectors are therefore limited to those situations in which the carrier flow rate can be maintained strictly constant.

In practice, it is difficult to maintain the carrier gas flow rate constant through the complete chromatographic apparatus. Many sources of variations exist including surges due to sample introduction and changes in column resistance. Moreover, it is known that the techniques of flow and temperature programming greatly improved the speed and often the resolution of the analysis conducted with chromatographic columns. In practice these techniques cannot however be used with concentration-sensitive sensors because of the changes in column gas flow rate which inevitably attend their use.

Some improvement can be obtained by the use of an enrichment procedure in which a portion of the carrier gas is removed under conditions in which the sample vapors are unaffected. This is achieved to some extent in commonly used gas chromatograph-mass spectrometer separator systems. While such procedures undoubtedly increase the sensitivity of the system, it is very difficult to maintain the enrichment ratio constant and indeed it varies even more than the case where enrichment is not practiced. Analytical accuracy is therefore decreased rather than increased.

OBJECTS AND SUMMARY OF THE INVENTION

It is therefore an object of this invention to improve the sensitivity and reliability of gas analysis systems.

Another object of the present invention is to provide for the elimination of variations in the flow rate of vapor sample through the detector portion of a gas chromatographic system.

A further object of the invention is the provision of a highly sensitive chromatographic gas analysis apparatus capable of flow and temperature programming and yet providing accurate and reliable quantitative data.

A further object of the invention is the provision of a gas analysis system capable of accurately analyzing very small quantities of sample.

These and other objects and many attended advantages of the invention will become apparent as the description proceeds.

In accordance with the present invention an apparatus for analyzing gas samples comprises means for separating the gas sample into component fractions, a detector means for detecting the presence of the fractions, means for introducing a first carrier gas stream into the separating means, transfer means disposed between the separating means and the detector means selectively permeable to the first carrier gas and means for introducing a controlled flow of second carrier gas into the first carrier gas stream before the transfer means.

The component fractions are conveyed to the transfer means by the first carrier gas stream. The first carrier gas stream is eliminated in the transfer device by passing through the walls thereof and the sample fractions are sequentially transferred into the second carrier gas stream which conveys the fractions through the detector means. The flow rate of the second stream can be selected to match the flow impedance or volumetric time constant of the detector to provide very accurate quantitative data.

The invention will now become better understood by reference to the following detailed description when considered in conjunction with the accompanying drawings.

DESCRIPTION OF THE PREFERRED EMBODIMENTS

The essential difference between the enrichment schemes of the prior art and the transfer device according to the invention is that with the inventive scheme all of the first carrier gas is removed and a sample is conveyed to the detector in a constant predetermined flow of second carrier gas. The second carrier stream can be controlled to flow at a rate just sufficient to provide the desired volumetric time constant of the detector.

Figure 1:
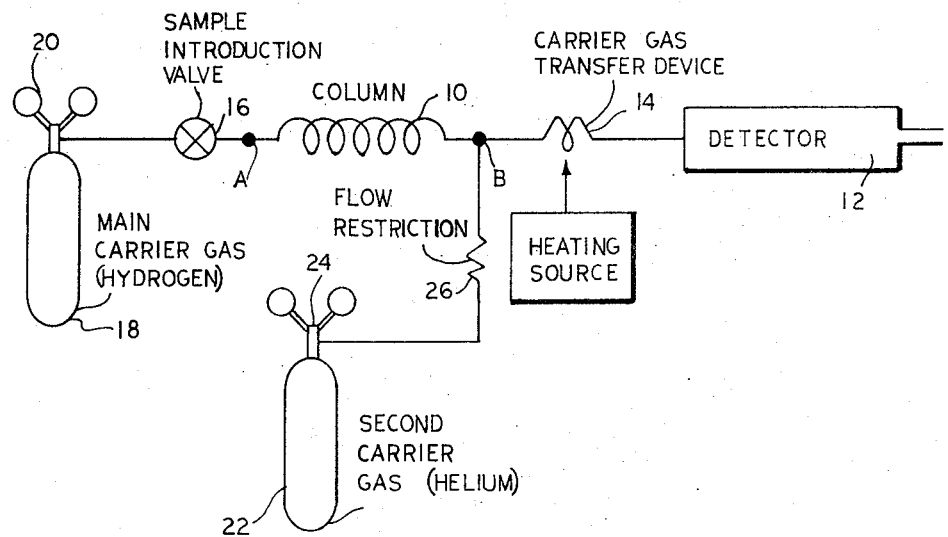
FIG. 1 is a diagrammatic illustration of one embodiment of an apparatus according to the invention.

For example, referring now to FIG. 1, the gas analysis system according to the invention includes generally a gas separation column 10, a detector 12 and a transfer device 14. The column 10 consists of a series of adsorbents which segregate the gas sample by affecting the rate at which the components flow through the column to provide an effluent containing a sequential passage of the components. The sample is introduced through sample introduction valve 16 at the entrance to the column 10 and is conveyed through the column by mixing it with a first carrier gas which is introduced at a constant pressure and flow rate from cylinder 18 containing a pressure and flow regulating valve head 20.

A second carrier gas is introduced to the system from cylinder 22 containing a regulating valve head 24 and flows through a flow restriction such as an orifice 26 before entering the system at a point after the column 10 but before the transfer device 14. The transfer device 14 is selected to be permeable to the first carrier gas but not to any other gas so that as the mixed carrier stream passes through the device 14 the first carrier gas is eliminated through the walls of the device and the sample components are left suspended in the second carrier or scavenge gas. The concentrated stream is then passed to the detector 12.

The detector may be a conventional colligative property sensor such as a thermal conductivity, ionization cross section or gas density balance detector or a mass spectrometer or any combination so as to determine the amount of each segregated constituent flowing from the column. The sample is usually very small in volume. Typically about 1 percent in relation to the first carrier gas. The very low concentration of sample is quite dramatically increased by providing a small controlled flow rate of second carrier gas.

As discussed the second carrier stream is selected to flow at a rate just sufficient to provide the desired volumetric time constant of the detector. For example, with a detector 10 microliters in volume, a second carrier flow of 10 microliters per second will provide a volumetric time constant of 1 second which is usually considered to provide adequate resolution in most applications. If the first carrier gas were flowing through the column at 1 ml. per second, a typical flow rate, then the transfer device which concentrates this sample 100-fold and increase the sensitivity of detection of the system in the same proportion.

Furthermore this improvement in sensitivity would be achieved with an improvement also in analytical accuracy since variations in the column flow rate would no longer be a source of error. Transmodulation, that is exchange of carrier gas, according to the invention is only possible through the use of a second carrier gas. The use of a premixed first and second carrier gas is only partially successful in achieving the advantages of transmodulation. Such a mixture introduced into the column would provide after transmodulation a gain in detectivity proportional to the ratio of the concentration of the first to that of the second carrier gas. A 1 percent mixture of second carrier gas and first carrier gas would, for example, provide a detectivity gain of 100-fold. This simple procedure still has the disadvantage that any change in column flow rate would be reflected in a corresponding change in the concentration of the sample in the second carrier gas. It is of value where a simple highly sensitive apparatus of moderate accuracy is all that is required.

However, with the apparatus of the invention the detectors may operate at their least detectable quantity level. With a conventional gas chromatograph incorporating a colligative property detector, both the peak area and the peak height corresponding to a given mass of test substance are functions of the carrier gas flow rate. The peak area which determines accuracy of analysis and peak height which determines sensitivity are inversely related to the carrier flow rate.

In addition, the least detectable quantity a colligative property detector can detect in isolation is: $D=K \cdot (PV/T)$ where $K$ is an overall constant for the detector; and $V$ is the volume of gas within the detector at the prevailing temperature $T$ and pressure $P$ conditions. It follows that the least detectable quantity can be progressively reduced by decreasing $P$ or $V$ or by raising $T$. With the ionization cross section and thermal conductivity detectors the practical lower limit of volume is in the region of 10 microliters. At this volume, the least detectable quantity is $3 \times 10^{-11}$ grams. This sensitivity to small masses shown by small volume colligative property detectors can only be realized under a restricted condition of operation. According to the invention it is not necessary to scale down the entire apparatus since the sample as isolated from the first carrier gas by the transfer device can be presented to the detector in a very small and enriched manner.

The successful operation of this system requires that the first carrier gas must be pure. Otherwise, the impurities will be concentrated in the transfer device and will reintroduce a dependence upon column flow rate. The flow of second carrier gas is preferably held constant. The volume of the transfer device and the associated tubing should be small compared with the detector volume. In the transfer device described below, these conditions are all fulfilled very satisfactorily.

Figure 2:
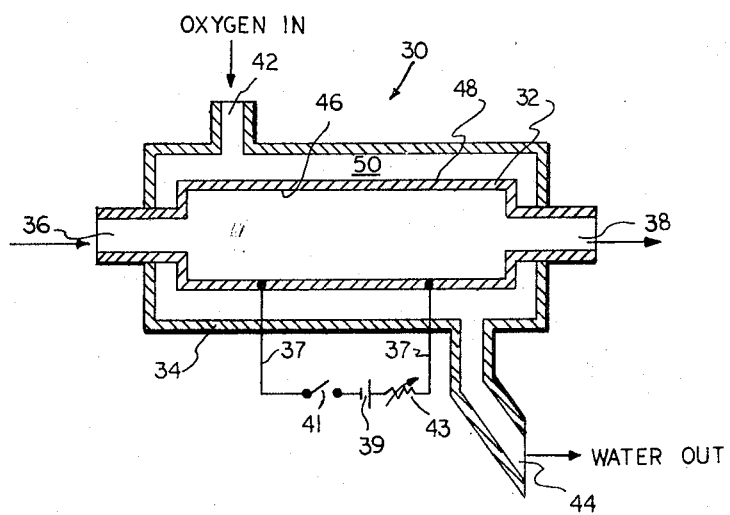
FIG. 2 is a sectional view illustrating the construction of a tubular palladium transfer device according to the invention.

The first carrier gas may be hydrogen of high purity and the transfer device comprises of a thin film of heated palladium. Palladium and some of its alloys are remarkably permeable to hydrogen as long as the palladium film is maintained at a temperature above about 100°-150° C. Referring now to FIG. 2, the palladium transmodulator device 30 comprises a thin-walled tube 32 of palladium surrounded by an outer container 34. The inlet end 36 of the tube 32 is connected to the effluent from a gas chromatograph, not shown, and the outlet end 38 is connected to the detector such as a mass spectrometer, not shown. Gas-pumping means are provided for removing hydrogen from the annular space 50 such as an oxygen inlet 42 and outlet drain 44. Electrical heating leads 37 are connected to the outer tube surface 48. The heating circuit includes a power source 39, variable resistor 41 and a switch 43.

A reaction is believed to take place in which palladium hydride forms on the inner surface 46 of tube 32 and transfers through the wall to the outer surface 48 of the tube 32 where it is decomposed into palladium and hydrogen. The transfer may be enhanced by a pressure driving force such as the internal pressure exerted by the gases within the tube or alternatively the chamber may be placed under vacuum to produce a pressure differential to draw the hydrogen into the annular space 50. However, because the reaction is reversible through the wall of the tube 32 it is preferable to feed oxygen into the annular space 50 through inlet port 42. The palladium catalyzes the combination of the transferred hydrogen with the oxygen to form water. Waste water exits through outlet drain 44. However, the gasified constituents of the sample and the second carrier gas are confined by the walls of the tube 32 and may exit through outlet 38 to the mass spectrometer or other detector for analysis.

The inner surface of the palladium tube may exhibit catalytic activity for some of the constituents of the sample. The temperature of the tube should be controlled so as to be below the temperature at which rearrangement of the sample constituents occurs. Alternately, the inner surface of the tubing may be coated or lined with suitable substances to hinder catalytic reaction. The coating or lining should be sufficiently thin and porous to permit ready passage of hydrogen. The catalytic effect of the palladium inner surface on the sample constituents may not necessarily be a disadvantage. The separation of argon and oxygen by gas chromatography is normally very difficult except at low temperatures. In the presence of hydrogen, the palladium surface, however, catalytically converts the oxygen to water vapor. So, if air is analyzed by a chromatograph including a molecular sieve column and a palladium transmodulator, argon, nitrogen and oxygen can be revealed as three peaks. In such a run the water peak was resolved by including a short column of Poropak Q between the transmodulator and the detector.

Pure palladium when subject to temperature cycling is the presence of hydrogen suffers mechanical distortions. However an alloy of palladium containing 25 percent silver is as permeable to hydrogen and is mechanically stable. The palladium tube may be provided in various configurations and lengths of tubing may be connected in parallel to provide increased surface area with less flow resistance.

Absolute hydrogen flux is dependent on the tube geometry and temperature. A palladium-25 silver tube 0.05 inch in diameter, 12 inches long having a wall thickness of 0.005 inch is permeable to hydrogen when heated to 200° C. This can be achieved by passing about 7 amperes of current through the length of the tube or any other convenient manner of heating the walls of the tube may be utilized. The flux of hydrogen through the walls of a palladium-25 silver alloy tube, 0.025 cm. in internal diameter, having a 0.125-cm. wall thickness and a 25-cm. length varies with temperature as the tube is heated in air as shown in the following table:

| Temperature, °C. | 200 | 250 | 300 | 350 | 400 | 450 |
|---|---|---|---|---|---|---|
| Flux, ml. sec.$^{-1}$ | 0.2 | 0.22 | 0.25 | 0.30 | 0.38 | 0.45 |

Gas chromatograph column flow rates are typically in the range of 0.01 to 1.0 ml. per second. Therefore there is no great problem in choosing a length of palladium tubing long enough to efficiently completely remove the hydrogen from the chromatograph effluent. Three 60-cm. lengths of palladium-25 silver alloy tubing having a 0.0075-cm. I.D. and 0.0375-cm. O.D. when coiled into 2-cm. diameter helices 5 cm. long and joined in parallel by connection with silver solder to 3-cm. lengths of capillary steel tubing provide a maximum hydrogen flux of about 5 ml. sec.$^{-1}$ which is a reasonable maximum for chromatographic use. A hydrogen flux of 220 ml. per minute is achieved at 500° C. and at 250° C. the flux is about 70 ml. per minute.

The following examples are offered solely for purposes of illustration.

A sample of 0.05 cc. of a 90 percent argon—10 percent methane was run through a molecular sieve column 1 foot long and 40 mm. in diameter. The detector was an ionization cross section detector having a full scale chart deflection of $3\times10^-$amperes. The hydrogen flow into the column was 100 ml. per minute and the helium flow into the transmodulator was 2.5 ml. per minute. The apparatus was run first with the palladium valve off and then with the palladium valve on. A 40-fold increase in sensitivity was demonstrated. A 23-fold gain in sensitivity was demonstrated in the capillary analysis of a $C_1$ to $C_5$ ester mixture.

A further experiment was run on a gasoline sample run through a 200-foot, 0.075-cm. stainless steel capillary gas chromatographic column internally coated with squalane. The detector was a thermal conductivity detector. The hydrogen carrier gas flow was programmed manually during the course of the analysis from 6 ml. per minute to 140 ml. per minute. In the second run the palladium transmodulator heating current was switched on to 8 amperes. In the first run a progressive loss of peak height and area with increasing flow and a drifting base line were both evidenced due to the sensitivity of the thermal conductivity detector to flow rate. In the second run the transmodulator was heated to a temperature at which hydrogen flow through the walls was initiated. In the second run flow programming is seen to be as effective as temperature programming when use is made of the transmodulator.

The combination of the transmodulator with a gas chromatograph and a reliable ionization cross section detector provides a universal, accurate analytical tool applicable for analysis of permanent gases. Such a compact and reliable system will find use in planetary exploration which has long needed a sensitive and reliable method of analysis of atmospheric gases. Furthermore, the system according to the invention provides the unexpected added capability of automatically resolving argon and oxygen which otherwise are difficult to separate.

It is to be realized that only preferred embodiments of the invention have been disclosed and that numerous modifications, substitutions and alterations are all permissible without departing from the spirit and scope of the invention.

What is claimed is:

1. A gas analysis system including:
   column means for separating a gas sample into component fractions;
   inlet means for introducing a first carrier gas into said column means for flowing the sample through the column means;
   outlet means for providing an effluent of separated fractions from the column means;
   second carrier gas introduction means disposed between the outlet means and the inlet to the carrier gas transfer means for introducing a second carrier gas into said effluent;
   carrier gas transfer means receiving the mixed carrier gas effluent, said transfer means being selectively and totally permeable to the first carrier gas and totally impermeable to the second carrier gas to transfer said sample from said first carrier gas to said second carrier gas; and
   detector means receiving the transferred effluent for sensing the presence of said components.

2. A system according to claim 1 in which the detector means comprises a flow-sensitive colligative property detector.

3. A system according to claim 2 in which said introduction means further includes means for providing a constant flow of said second carrier gas.

4. A system according to claim 1 in which the column means comprises a gas chromatograph.

5. A system according to claim 1 in which the first carrier gas is hydrogen and the transfer means comprises a sheet of material selectively permeable to hydrogen.

6. A system according to claim 5 in which the hydrogen transfer means comprises a tube of palladium and the system further includes means for heating the tube.

7. A system according to claim 6 in which means are provided for removing hydrogen from a wall of the tube opposite that containing the effluent.

8. A system according to claim 7 in which the removal means comprises oxygen in contact with said opposite surface.

9. A method of analyzing a material comprising the steps:
   dispersing a minor amount of material to be analyzed in vapor form in a first carrier gas consisting of hydrogen;
   flowing the gas dispersion through a gas separator;
   introducing a second carrier consisting of helium gas into the effluent from the separator;
   flowing the mixed carrier gas dispersion past a palladium-containing surface selectively and totally permeable to said first carrier gas and removing said first carrier gas; and
   analyzing the dispersion of the vaporous material remaining in the second carrier gas.

10. A method according to claim 9 in which the second carrier gas is introduced at a controlled flow rate.

11. A method according to claim 10 in which the flow rate of the second carrier gas is not more than the flow rate of the vaporous material.

12. A method according to claim 9 in which the permeable surface comprises a tube of palladium.

13. A method according to claim 12 in which the tube comprises a palladium-silver alloy.

14. A method according to claim 13 in which the tube is heated to a temperature above 100° C.

15. A method according to claim 12 in which the effluent flows through the inside of said tube and further including the step of removing hydrogen from the outside surface of the tube.

16. A method according to claim 15 in which the outside surface of the tube is in contact with oxygen and pumping is provided by reaction of the hydrogen emerging from the outside wall of the tube with the oxygen to form water.

* * * * *